United States Patent
De Bruyn et al.

(10) Patent No.: US 8,977,535 B2
(45) Date of Patent: Mar. 10, 2015

(54) TRANSLITERATING METHODS BETWEEN CHARACTER-BASED AND PHONETIC SYMBOL-BASED WRITING SYSTEMS

(75) Inventors: Pierre-Henry De Bruyn, Hong Kong (CN); Philippe Naegele, Saint Médard en Jalles (FR)

(73) Assignee: Pierre-Henry De Bruyn, Brussels (BE)

( * ) Notice: Subject to any disclaimer, the term of this patent is extended or adjusted under 35 U.S.C. 154(b) by 238 days.

(21) Appl. No.: 13/440,745

(22) Filed: Apr. 5, 2012

(65) Prior Publication Data

US 2012/0259614 A1     Oct. 11, 2012

Related U.S. Application Data

(60) Provisional application No. 61/472,365, filed on Apr. 6, 2011.

(51) Int. Cl.
  *G06F 17/28*  (2006.01)
  *G06F 17/20*  (2006.01)

(52) U.S. Cl.
  CPC .................................. *G06F 17/2863* (2013.01)
  USPC .................................................. 704/2; 704/8

(58) Field of Classification Search
  USPC ......................................................... 704/1–10
  See application file for complete search history.

(56) References Cited

U.S. PATENT DOCUMENTS

| | | | | |
|---|---|---|---|---|
| 5,903,861 A * | 5/1999 | Chan | | 704/9 |
| 5,918,206 A * | 6/1999 | Wong et al. | | 704/271 |
| 6,810,374 B2 * | 10/2004 | Kang | | 704/2 |
| 6,848,080 B1 * | 1/2005 | Lee et al. | | 715/203 |
| 7,512,533 B2 * | 3/2009 | Fux et al. | | 704/7 |
| 7,822,596 B2 * | 10/2010 | Elgazzar et al. | | 704/2 |
| 2004/0167769 A1 * | 8/2004 | Becker | | 704/3 |
| 2005/0222838 A1 * | 10/2005 | Gong | | 704/5 |
| 2006/0025999 A1 * | 2/2006 | Feng et al. | | 704/267 |
| 2007/0021956 A1 * | 1/2007 | Qu et al. | | 704/8 |
| 2007/0118356 A1 * | 5/2007 | Badino | | 704/10 |
| 2008/0097745 A1 * | 4/2008 | Bagnato et al. | | 704/8 |
| 2008/0221866 A1 * | 9/2008 | Katragadda et al. | | 704/8 |
| 2008/0270111 A1 * | 10/2008 | Hanumanthappa | | 704/3 |
| 2012/0259614 A1 * | 10/2012 | De Bruyn et al. | | 704/3 |

* cited by examiner

*Primary Examiner* — Samuel G Neway
(74) *Attorney, Agent, or Firm* — McCracken & Gillen LLC

(57) ABSTRACT

This invention concerns a method for transliterating an at least partially phonetic symbol-based writing system including entry of symbols into a complex character-based writing system including characters, comprising:

entering with a human-to-machine interface a string of symbols into a transliterating engine, the string of symbols comprising a series of symbols at least corresponding to pronunciation of a string of characters;

parsing the string of symbols into a series of symbols, each series of symbols forming an utterance unit corresponding to a character of the string of characters;

transliterating the series of symbols into the corresponding characters;

displaying the characters;

wherein the transliterating step comprises matching by database retrieval each series of symbols with one and only one character.

25 Claims, 9 Drawing Sheets

| N° | Rad. | RUCL1 |
|---|---|---|
| 9 | 亻 | A |
| 61 | 忄 | B |
| 30 | 口 | C |
| 149 | 讠 | D |
| 72 | 日 | E |
| 167 | 金 | G |
| 196 | 鸟 | H |
| 32 | 土 | I |
| 112 | 石 | J |
| 75 | 木 | K |
| 142 | 虫 | L |
| 85 | 氵 | M |
| 162 | 辶 | N |
| 86 | 灬 | O |
| 195 | 鱼 | P |
| 38 | 女 | Q |
| 163 | 阝 | R |
| 64 | 扌 | S |
| 118 | 竹 | T |
| 46 | 山 | U |
| 140 | 艹 | V |
| 120 | 纟 | W |
| 130 | 肉 | X |
| 157 | 足 | Y |
| 145 | 衣 | Z |

FIG. 1

| N° RUCL | Conventional radical | N° SRUCL | Conventional radical | SRUCL |
|---|---|---|---|---|
| 135 | 舌 | 30 | 口 | C |
| 73 | 曰 | 149 | 讠 | D |
| 74 | 月 | 167 | 金 | G |
| 183 | 飞 | 196 | 鸟 | H |
| 101 | 用 | 112 | 石 | J |
| 65 | 支 | 75 | 木 | K |
| 170 | 阝° | 163 | °阝 | R |
| 90 | 爿 | 118 | 竹 | T |
| 179 | 韭 | 140 | 草 | V |
| 178 | 韦 | 145 | 衣 | Z |
| 200 | 麻 | 145 | 衣 | Z |

FIG. 2

| RUCL1 | DRUCL + | DRUCL - |
|---|---|---|
| A | A+ (or A:) | A- (or A̲) |
| B | B+ (or B:) | B- (or B̲) |
| C | C+ (or C:) | C- (or C̲) |
| ... | ... | ... |
| Z | Z+ (or Z:) | Z- (or Z̲) |

FIG. 3

Phrases used for memorizing the Radical Upper Case Letters and their corresponding radical families

A: Men 人 (A)
are qualified 父長(=长)大高老艮爻玄彡 (A+)
and are in relation 攴(=攵) or are cadaverous 尸 (A-).

B: The heart 心 (B)
resonates with music 音耳鼓龠 (B+)
and disputes 革爪(=爫)面 (B-).

C: For the mouth 口 and the tongue 舌(C),
food 食麥黍瓜 (C+)
has a variety of tastes 香, 甘, 鬯, 鹵, 辛 (C-).

D: Speech 言 says 曰 (D)
using particles 而門比尢尤(=允)非毋 (D+)
and showing culture 土文卩聿(D-).

E: The sun 日 (E)
allows contemplation 見见 with the eyes 目(E+)
and measures time 辰千幸夕巳又(E-).

F: Illnesses 疒(F)
are caused by the winds 風风(F+)
or perverse blow 气(F-).

G: Metal 金 and the moon 月 (G)
one makes spoons 勹匕(G+),
the other astrology 卜几臼彐(=且)(G-).

H: The bird 鳥 by flying 飛(H)
seeks to dominate like an official 臣隶(H+)
but is only poultry 羽隹龍(=龙)(H-).

I: On land 土(I)
in a property 釆(I+)
some plant their vegetables 豆 and cereal crops 禾(I-)

J: The rock 石 is used 用(J)
as a precious stone 玉(=王)(J+)
or as a weapon 弋殳弓矢戈矛(J-).

K: The trees 木 and their branches 支(K)
need rain 雨(K+)
and are used to make doors 門(K-).

L: Insects 虫(L)
in cultivated 耕 fields 田(L+)
meet with wild animals 鹿屯鼠(=鼡)豸(L-).

M: Water 水(M)
is in liquid 川巛氵酉 or solid 冫 form (M+)
but in man in bloody condition 血(M-).

N: Motion 辶(=走)(N)
allows walking 彳 (N+)
and all kinds of actions 行欠疋(=疑)癶(=發, 登) 申齊(=斉)厶(=去, 参)(N-).

O: Over the fire 火灬(O)
one cooks rice 米 O+)
in utensils 鼎缶皿(O-).

P: Fish 魚(P)
that are under ships 舟(P+)
are caught in nets 网(=罒)with turtles 黽(=黾)龜 (=龟)(P-).

Q: Women 女(Q)
have had many 一二八(=丷)十卄斤斗寸里(Q+)
live 生 children 子(Q-).

R: The qualities ( left ⻖ right ⻏ ) (R)
of families 戶 and clans 氏(R+)
are made up of accumulated traits 丨 丶 丿 乙(= 一) 亅 or (R-).

S: With his hands 手(S)
man expresses 示 his work 工(S+)
and his body 身骨皮首鼻牙齒(=齿)(S-).

T: With bamboo 竹 strokes on our walls 爿(T)
we learn attitudes 入廴止走舛立(T+)
and openness 凵匚匸厂广(T-).

U: In the mountains 山(U)
one goes from one 自 place 至 to another by car 車(U+) or on horseback 馬 (U-).

V: Plants 草 and leeks 韭(V)
grow like hair on the body 毛 or on the head 髟 (V+) and
come in multiple colors 色黑赤黃青白(V-).

W: Silk 糸(W)
and cloth 黹巾(W+)
are used by tailor's knives 刀 to cut them into strips 片(W-).

X: Their meat 肉(X)
and their strength 力(X+),
this is what domesticated animals bring 豕犬犭 羊牛(X-).

Y: On foot 足(Y)
one discovers space 囗穴谷(Y+) but where you go, you cover up 角方瓦亠冖宀髙兩(=両)(Y-).

Z: Clothing 衣 made from hemp 麻 or leather 韋(Z)
on us and pages 頁(Z+) on our thoughts
are but fragile shells 貝(Z-)!

FIG. 4

| N° | Rad | RUCL1 | Visual relations |
|---|---|---|---|
| 9 | 亻 | A, | 亻=人→∧→A→A→/ |
| 61 | 忄 | B₀ | 小=心→中→B→b→σ |
| 30/135 | 口 or 舌 | C_c | 口=回→β→C→c |
| 149/73 | 讠 or 日 | D₀ | 讠=言→忄→力→D→J→౨ |
| 72 | 日 | E_ε | 女=E→E→ε |
| 104 | 病 | F_∞ | 病=病→F→F=f→∞→∞ |
| 167/74 | 金 or 月 | G | 金=金→G=C→G→∫→∫ |
| 196/183 | 鸟 or 飞 | H_ч | 鳥=魚→H→H→ч→ч |
| 32 | 土 | I_l | 土=圡→I→ₗ |
| 112/101 | 石 or 用 | J_↓ | 石=石→J→J→J→↓ |
| 75/65 | 木 or 支 | K_ᵥ | 木=木→K→K→ᵥ |
| 142 | 虫 | L_L | 虫=虫→L→L→ʟ |
| 85 | 氵 | M_ᴀ | 永=氵→氺→M=M→M→ᴀ |
| 162 | 辶 | N_n | 辶=ᴢ→N→N=n→n |
| 86 | 灬 | O_o | 火=灬→o→O→₀ |
| 195 | 鱼 | P_౨ | 魚=⊠→ᴅ→P=P→p→౨ |
| 38 | 女 | Q_ᴀ | 女=女→Q→ᴄ→ᴠ |
| 170/163 | 阝 or 阝 | R_R | 阝=阝→R→ʀ |
| 64 | 扌 | S_s | 手=扌→S→ₛ |
| 118/90 | 竹 or 爿 | T_ᴛ | 竹→竹→T→ᴛ |
| 46 | 山 | U_U | 山→山→U→ᵤ |
| 140/179 | ⺿ or 韭 | V_ᵥ | 草→⚘→V=ᵥ→ᵥ |
| 120 | 纟 | W_ᴀ | 系=纟→W→W→ᴀ |
| 130 | 肉 | X_α | 肉→⊠→X→α→α |
| 157 | 足 | Y_ᵧ | 足→彡→Y→γ→γ |
| 145/178/200 | 衣 or 韦 or 麻 | Z_z | 衣→衤→乙→Z→z |

FIG. 5

TRANSLITERATING METHODS BETWEEN CHARACTER-BASED AND PHONETIC SYMBOL-BASED WRITING SYSTEMS

CROSS REFERENCE TO RELATED APPLICATION

This application claims priority to U.S. Provisional Application No. 61/472,365, filed Apr. 6, 2011, the content of which is incorporated herein by reference in its entirety.

BACKGROUND

1. Field of the Invention

The invention relates to the field of transliterating one writing system into another writing system and vice versa. More in particular, the invention relates to the field of transliterating one writing system into a complex character-based writing system, preferably a Chinese character-based writing system, and vice versa.

2. Description of Related Art

Languages using Chinese characters as at least part of their writing system suffer from the difficulty in memorizing the large number of characters that are need for daily use. Examples of such languages comprise Sinitic languages, Japanese, Korean and Vietnamese, although Korean and Vietnamese are today rarely written with Chinese characters.

The number of Chinese characters is large, and no accurate account has been made for determining the exact number. However, the number of Chinese characters included in the Kangxi dictionary, which acts as a reference, is approximately 47,035.

As reading teaching/learning and reading helps, several Romanization systems have been developed over the years. The most widely used today are Hanyu Pinyin for the official Chinese language of China, Hepburn Romanization for Japanese, McCune-Reischauer Romanization and Revised Romanization of Korean for Korean. Vietnamese is today officially writing in a version of the latin alphabet, which can be used to Romanize Chinese characters into Sino-Vietnamese pronunciation thereof.

Furthermore, the phonological nature of the languages that use Chinese characters results in that there are numerous homophonous characters, what makes it difficult for the learner to know which character to use.

For example, when using Microsoft Input Method Editor (IME) developed for writing in simplified Chinese characters via Hanyu Pinyin, there are 124 characters corresponding to "yi" (tone non discriminating Hanyu Pinyin). When using Microsoft Input Method Editor (IME) developed for writing in traditional Chinese characters via Hanyu Pinyin, there are 369 characters corresponding to "yi". As for Japanese, with Microsoft IME 2002, there are 71 characters for "shi". As a matter of fact, all characters used in one language do not have the same prevalent. Some are more commonly used than others. But still, the number of homophonous characters can exceed 100.

Also, most of the Chinese characters carry a hint on their meaning. For example, many characters relating to feeling have a component (called radical) bearing the meaning of "heart", many characters relating to action made using hands have a radical bearing the meaning of "hand", etc.

This hint on meaning are lost when the characters are romanized, thus it is difficult for the learner to find out the meaning of a transcribed word.

Then, there exist no tool to reliably transliterate one text written in a Romanization system, i.e. in a writing system conveying pronunciation, into Chinese characters bearing text, i.e. conveying meaning.

SUMMARY

One aim of the invention is thus to provide a method for easing learning of languages using a character-based writing system.

Another aim of the invention is to provide a method for reliably transliterating one writing system into a complex character-based writing system and vice versa.

The present invention provides a method for transliterating an at least partially phonetic symbol-based writing system including symbols into a complex character-based writing system including characters, comprising the following steps:

entering with a human-to-machine interface a string of symbols to a transliterating engine, the string of symbols comprising series of symbols at least corresponding to pronunciation of a string of characters;

parsing the string of symbols into series of symbols, each series forming an utterance unit corresponding to a character of the string of characters;

transliterating the series of symbols into the corresponding characters;

displaying the characters;

wherein the transliterating step comprises matching by database retrieval each series of symbols with one and only one character.

Thus, it is now possible to convert a text entirely in a phonetic symbol-based writing system into a text written with a character-based writing system. This is particularly interesting for Chinese characters, learning of which takes much time whereas learning to speak a language using these characters requires substantially less time. The learner can thus first learn to speak the language, transcribe it into the phonetic symbol-based writing system and input the text in the transliterating engine that will transliterate the text into Chinese characters, without the need for the learner to master Chinese characters.

In one embodiment, the method can comprise displaying the string of symbols. Thus, it is possible for the user to compare the text written in the phonetic symbol-based writing system with the character-based writing system.

The present invention also provides a method for transliterating a complex character-based writing system including characters into an at least partially phonetic symbol-based writing system including symbols, comprising:

entering with a human-to-machine interface a string of characters to a transliterating engine, the string of characters corresponding to a string of symbols comprising series of symbols;

parsing the string of characters into individual characters, each character corresponding to a series of symbols of the string of symbols;

transliterating the characters into the corresponding series of symbols;

displaying the string of symbols;

wherein the transliterating step comprises matching by database retrieval each series of symbols with one and only one character.

Therefore, it is now possible to transliterate character-based writing system, says Chinese characters, into a phonetic symbol-based writing system without impairing the understanding of the original text. Indeed, the most important particular of a character-based writing system is that meaning is given priority over sounds. Thus, in such writing system, each character carries a meaning in itself This information is conventionally missed and lacking in all known transliteration method that only tries to transcribe sounds. With the method of the present invention, it is possible to retain information on meaning of each character within the phonetic symbol-based writing system itself In one embodiment, this method further comprises displaying the string of characters. Thus, it is possible for the user to compare the text written in the phonetic symbol-based writing system with the character-based writing system.

In another embodiment of both methods, the database retrieval step matches a first part of the characters individually with a series of symbols comprising a phonetic series of symbols and a meaning-hinting series of symbols.

The phonetic series of symbols gives the pronunciation of the character, while the meaning-hinting series of symbols gives a hint on the meaning of the character.

In still another embodiment, the phonetic symbol-based writing system is Latin alphabet. Thus, since Latin alphabet is the most known writing system around the world, the method is accessible to the majority of people.

The phonetic symbol-based writing system can also be Korean hangul, Japanese kana (hiragana and/or katakana) or any other phonetic symbol-based writing system.

The character-based writing system is advantageously at least partly based on the Chinese character writing system comprising at least one of the following sets of characters: traditional hanzi, simplified hanzi, kanji, hanja, chu nho, or chu nôm.

The invention also provides a computer-based system adapted to implement the method of the invention.

The invention further provides a computer program or computer program product capable, when executed in a computer-based system, to perform the method of the invention.

The invention still provides a database for use with the method, system, computer program or computer program product of the invention.

Hereafter, it will be strictly made use of vocabulary used by linguists. Thus, meaning of words "transcribe" and "transliterate" (and their derivates) should be differentiated. a "transcription" is the systematic representation of a spoken language in written form, while a "transliteration" is the representation a text from one writing system in another writing system.

A "writing system" is understood hereafter as a way of transcribing a language. There are many kinds of "writing system":

logographic, wherein each symbol (or character) represents a morpheme, i.e. the smallest component of a word, or other linguistic unit, that has semantic meaning (example: Chinese characters);

syllabic, wherein each symbol represents a syllable or a mora (example: Japanese kana);

alphabetic, wherein each symbol represents a phoneme (consonant or vowel), i.e. the smallest segmental unit of sound employed to form meaningful contracts between utterances (example: Latin alphabet, Hangul; the latter is also considered as a featural alphabet);

abugida, wherein each symbol represents a combination of consonant and vowel phonemes (example: Indian Devanagari); and abjad, wherein each symbol represents a phoneme (mostly consonant) (example: Arabic alphabet).

In the following of the specification, a character-based writing system is a logographic writing system, while a phonetic writing system can be either one of a syllabic, alphabetic, abugida or abjad kind of writing system.

"Character" will be used for naming a symbol of the character-based writing system, will "symbol" will be used for a symbol of the phonetic writing system.

"Homophonous characters" should be understood as characters having the same pronunciation without taking tones into consideration. Thus, two Chinese characters, both pronounced "yi" but one with a rising tone and the other with a falling tone, will be considered "homophonous characters" for the purpose of the description.

BRIEF DESCRIPTION OF THE DRAWINGS

FIG. 1 is a table showing matching of conventional radicals of Chinese character writing system with HanMuFa Simple Radical Upper Case Letters.

FIG. 2 is a table showing 11 conventional radicals additionally matched with HanMuFa Simple Radical Upper Case Letters.

FIG. 3 is a table showing the 78 HanMuFa Radical Upper Case Letters (SRUCL and DRUCL).

FIG. 4 illustrates an example of mnemonic phrases making learning of HanMuFa RUCL easier.

FIG. 5 is a table showing the conventional radicals matched with HanMuFa RUCL and the visual relations between the convention radicals and HanMuFa RUCL to which they are matched. This table also illustrates an example of simplified HanMuFa.

DETAILED DESCRIPTION OF A PREFERRED EMBODIMENT

Figure 6:
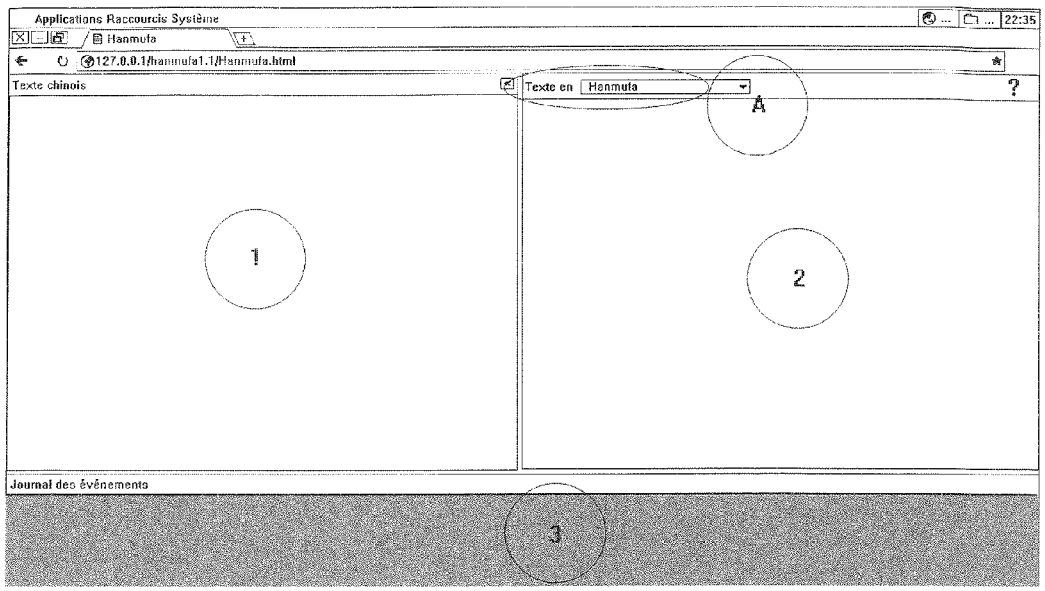
FIG. 6 is a screen shot of home screen of HanMuFa transliterating engine displayed on a screen.

The following description provides one example of embodiment of the method for transliterating an at least partially phonetic symbol-based writing system including symbols into a complex character-based writing system including characters and vice et versa.

This example takes the official Chinese language (also called Beijing dialect) of the People's Republic of China (called "Putonghua"), Taiwan (called "Guoyu") and Singapore (called "Huayu"), hereafter called "Mandarin", although it is also possible to consider another Chinese languages or dialects such as Shanghainese ("Wu"), Cantonese ("Yue"), etc. or even another language using Chinese characters such as Japanese, Korean or (old) Vietnamese.

Thus, the method described more in detail is a method for transliterating Chinese characters into a phonetic writing system such as an alphabetic writing system which is Latin alphabet and vice et versa. This method of transliteration not only transliterates the Mandarin phonetic information of Chinese characters, but also their semantic information. To do so, this method uses a specially designed partially phonetic writing system called HanMuFa (from "HANzi ziMU xieFA", which means "method for tranliterating Chinese characters with letters").

Thus, the method provide a tool for converting texts written in Chinese characters into an alphabetic writing system that comprises sufficient information to ensure unambiguous understanding of the texts.

As the method is a reversible one, it gives the advantage that Westerners may be able to learn a Mandarin alphabetic version of a Chinese text initially written in characters without possibly ever having learnt and especially memorized the characters.

Using this method suitably implemented in a computer program or software, and after learning Mandarin using HanMuFa, western users will also be able to automatically transliterate into Chinese characters any text that they themselves have written in HanMuFa, taking care to check that it is perfectly transliterated using only their knowledge of HanMuFa. Publishers of books initially written in Chinese characters will be able to both print these works in Chinese characters for those who master this writing system and in an alphabetic writing system accessible to a wider public.

HanMuFa is based on two analyses: logic inherent to Chinese characters and the specific characteristics of alphabetic writing system.

Chinese characters stand out by their specific shapes. They can be grouped and sorted by "radicals" (also known as "keys"). These "radicals" or "bushou" in Mandarin are a part (or sometimes all) of the character and their number is conventionally limited and depends on the various classification modes (214 being the number traditionally used since the 18th century but others exist).

The "radical" points to a family of meanings but does not in itself provide a sufficient semantic or phonetic information. It is however the minimum form of identification and recognition for a character in a set. Thus, in HanMuFa, the "radical", i.e. the necessary and sufficient part will be taken as the basic criterion used to distinguish between each character with same pronunciation and using its specific alphabetic transcription rather than the entire form of each character.

The number of characters is not set and leads to the production of a large number of characters (over 50,000 characters are known today), while the number of radicals that allow a distinction between the characters is necessarily limited by convention. With an alphabetic writing system that represents a number of characters also limited by convention, finding a way to alphabetically transliterate Chinese characters results in reducing the conventional radicals used to classify Chinese characters to a smaller number (e.g. the twenty six letters of the Latin alphabet).

HanMuFa makes use of the 214 conventional radicals as a starting point for the reduction into a smaller number of radicals as described below. However, another set of radicals could be taken into consideration instead, and the person skilled in the art would have no difficulties in adapting HanMuFa to this different set of radicals.

The number of reduced radicals is 26×3, thus 78 radicals called "Radical Upper Case Letters" and are represented by symbols of the Latin alphabet.

The 214 conventional radicals have been distributed between the 78 Radicals Capitals. The following rules have been chosen for this distribution to ease their memorization.

First, forms of a first part of the conventional radicals are compared with that of some of the Latin capital letters and matched. This first set of Radical Upper Case Letters is called "Simple Radical Upper Case Letters" (SRUCL) (see FIG. 1).

Second, the remaining conventional radicals are grouped into families. The conventional radicals grouped in one family have similar meanings amongst themselves and with one conventional radical of the first part. Two further sets of Radical Upper Case Letters called "Derived Radical Upper Case Letters" (DRUCL) are yielded (see FIG. 3) for each of the SRUCL. This is possible by enlarging the Latin alphabet with two modifiers, hence the 78 Radical Upper Case Letters.

Thus, the two further sets of Radical Upper Case Letters are a "positive" or "shang" Radical Upper Case Letters and a "negative" or "xia" Radical Upper Case Letters. The modifiers used are two dots (or colon) for the positive Radical Upper Case Letters (A:, B:, C:, etc.) and an underlining for the negative Radical Upper Case Letters (A, B, C, etc.) (see FIG. 3).

Discriminating the different Chinese characters is carried out in three steps.

During a first step, each character is assigned a Radical Upper Case Letter. This assignment may be automatically generated from an index that specifies the conventional radical of the character. The assigned Radical Upper Case Letter, together with the atonic Pinyin transcription of this character (or to one of the Pinyin transcriptions when there are more than one), helps to remove some of the many ambiguities that exist between the Pinyin transcriptions of homophonous characters (and there are many of these in Mandarin). These automatically assigned Radical Upper Case Letters are called primary Radical Upper Case Letters (RUCL1), which can be a SRUCL or a DRUCL and correspond to a first classification level.

A second classification level may be needed depending on the case, in particular, when two homophonous characters are assigned the same Radical Upper Case Letters mentioned above. This second sub-classification comprises selecting, for characters in conflict, from the part of the character not comprised in the conventional radical (the one that does not include the radical already shown using the conventional classification), a second Radical Upper Case Letter (called secondary Radical Upper Case Letter—RUCL2).

Now, to simplify HanMuFa to the maximum, the transcription of this "secondary radical" will only take the form of an SRUCL and never a DRUCL. Hence, even if the form taken by this secondary radical ties it to a DRUCL, only the corresponding SRUCL (DRUCL minus the modifier) is transcribed and not the DRUCL. In other words, in RUCL2 form, there are only SRUCL and no DRUCL used to distinguish the characters amongst themselves. Consequently, there are only 26 possibilities rather than 78.

A last level of simplification of HanMuFa is achieved by introducing a "zero" category into each of the preceding two levels. To do this, characters having a same Pinyin transcription are sorted according to their usage frequency yielding a frequency list. For each of these levels, the most frequently used characters in a given list of characters would be distinguished from the others by the absence of any distinction sign (whether RUCL1 or RUCL2) rather than by the presence of a RUCL1 corresponding to the radical that it is in, or could be secondarily classified in based on its RUCL2. Two kinds of lists exist: list of homophonous characters and list of homophonous characters with same RUCL1.

For the list of homophonous characters comprising more than one character, approximately 400 characters are chosen and are called "primary phonetic reference characters" (PRC1). They are namely those that are most frequently used in the list of homophonous characters to which they belong. 400 is the approximate number of syllables in Mandarin (rhotic coda excluded, this coda being transcribed in the Chinese writing system with a particular character). For these 400 PRC1, Pinyin transcription is considered strictly enough for their identification without any need to add a Radical Upper Case Letter. If there is only one character in the list of homophonous characters, its Pinyin transcription is called "simple phonetic characters" (SPC).

In other cases, the characters of the list of homophonous characters but the PRC1 are sorted according to their RUCL1 (list of homophonous characters with same RUCL1).

In the same way as for the lists of homophonous characters, the most frequently used characters of each list of homophonous characters with same RUCL1 will be assigned its Pinyin transcription (or Pinyin transcriptions if there are more than one) with the corresponding RUCL1, without it being necessary to assign a RUCL2. These characters to which only an RUCL1 and Pinyin transcription(s) are assigned to are called "secondary phonetic reference character" (PRC2) for the corresponding lists of homophonous characters with same RUCL1. PRC2 therefore have RUCL1 but no RUCL2. PRC2 are distinguished from CPS by the fact that there are homophonous characters with which they can be confused, whereas CPS cannot be confused with any, if a RUCL2 is not used.

The other characters of the lists of homophonous characters with same RUCL1 but the PRC2 are "derivative phonetic characters" (DPC) and are assigned a RUCL2 together with RUCL1 and Pinyin transcription.

RC2 is purely a convention, and only helps to distinguish between homophonous characters with same RUCL1.

Since it is easier to remember that one character has the same Radical Upper Case Letter (i.e. SRUCL or DRUCL without the modifier) twice, for the RUCL1 and the RUCL2, than to remember two different Radical Upper Case Letters, a further distinction level is made:

"binary derived phonetic characters" (BDPC) are those with same Radical Upper Case Letter for their RUCL1 and RUCL2; and "complex derived phonetic characters" (CDPC) are those with two different Radical Upper Case Letter for their RUCL1 and RUCL2.

In brief, PRC1 have neither RUCL1 nor RUCL2; PRC2 and SPC have only RUCL1; BDPC have RUCL1 and RUCL2 with same Radical Upper Case Letter; and CDPC have RUCL1 and RUCL2 with different Radical Upper Case Letters.

There are therefore 79 primary lists (78 Radical Upper Case Letters (either SRUCL or DRUCL) and 1 for PRC1 and SPC) and 27 secondary lists (26 RUCL2 and 1 for PRC2).

It can be taken as a convention that a series of characters placed under a CPR2 will by definition comprise at least one BDPC. Namely, if there are only one character under the CPR2, this character will be considered as a SPC and received a RUCL2 corresponding to the RUCL1.

An analysis of the specific characteristics of writing systems using alphabetic letters started with a comparison between texts written in characters and those written with letters.

On one hand, texts written with characters comprise graphic elements (called "characters") that follow each other and are not separated to form words. The graphic elements are essentially recognized by the form of their specific figures, forms that are grouped together by reference to "radicals" forming at least a part of each character, a radical is often a part of a character that bears a semantic evocation function, i.e. that hints the meaning of the character. Chinese characters in particular most often comprise two parts: a first part that is more semantic in nature and a second part that is more phonetic, without there being any logical and rigorous way to determine which is semantic and which is phonetic.

On the other hand, texts written with letters are formed of groups of letters assembled into words separated from each other by a space. These words represent the basic semantic unit of each sentence; neither the letter nor one of its parts does. Letters convey more generally sounds than shape or meaning and are distinguished purely by a phonetic convention. In particular, in Latin alphabet there are two forms for each letter: a lower and UPPER case.

Thus, an alphabetic transcription of Mandarin from Chinese characters necessarily must use word separators for the transliterated texts. Tools are already freely available on Internet for alphabetic transliteration of Mandarin (or Japanese).

Further, since Latin alphabet uses two cases of letters, it makes it possible to use lower case letters for the usual purpose of alphabetic writing system, i.e. phonetic function of letters, while upper case letters would take on a yet-to-be-defined role so that Latin alphabet is used as a writing system that brings the letter system closer to that of Chinese characters, i.e. also conveying hint on meaning.

Upper case letters are either a part of the initial syllable of a word or are alone. Upper case letters are in limited and fixed numbers (26 for the Latin alphabet). They always have not only a phonetic function ("they are read and pronounced") but they also have a mute semantic function that varies from language to language (e.g. in French they indicate that the word is a noun, while in German they indicate that the word belongs to a given grammatical category (substantive)). When they carry the semantic function, they are called Capital.

Thus, it is possible to build a writing system for alphabetically transliterating Chinese characters, wherein upper case letters would take on a purely semantic function (they are seen without being read phonetically), and be placed after lower case letters forming a syllable rather than in front, so as to properly mark their phonetically "mute" function.

The system of Radical Upper Case Letters was built in four stages.

26 conventional radicals were first matched with each upper case letter taking their shape, that could relates to the upper case letter in question, and the large number of characters classified under these conventional radicals into consideration. These upper case letters are called Simple Radical Upper Case Letters (SRUCL) as indicated above.

11 conventional radicals are then grouped with 10 of the SRUCL (one SRUCL, the Z one, receiving two additional assigned conventional radicals) (see FIG. 2), for either one of the reasons mentioned above or because their meaning could resemble the SRUCL in question. These additional 11 conventional radicals do not form a further group of Radical Upper Case Letter, but merely enlarge the number of conventional radicals to which 10 of the 26 SRUCL are assigned.

Therefore, the 26 upper case letters of Latin alphabet are assigned to one, two (C, D, G, H, J, K, R, T, V) or three (Z) conventional radicals (see FIGS. 1 and 2).

Two additional categories are created for each of the 26 upper case letters to which a modifier is added. Two modifiers are used and are one of two distinct diacritical signs. A first sign is "+", ":" or a line over the upper case letter for the so-called "shang" or "up" category. A second sign is "−" or an underline under the upper case letter. for the so-called "xia" or "down" category.

Conventional radicals having more or less similar meaning are grouped into one category.

This set of 78 radical categories was then summarized into 26 mnemonic phrases so that they are easier to learn (see FIG. 4).

In a variant, diacritical signs are provided to substitute the upper case letters so that RUCL do not impede reading of the phonetic information provided by each lower case letter. These diacritical signs are built from the 26 letters of Latin alphabet (see FIG. 5). Legibility was taken into consideration when creating these diacritical signs.

Some upper case letters have been simplified by reducing them to just one of the lines forming them (like "A", "G" or "Q"), while others have been flattened and deformed (like "B" via "b", "F" via "f", "H" or "P" via "p"). Others are reduced to a reminiscent form of the Chinese conventional radical (like "G", "I", "J" ou "P") or the letter that it stands for (like "D"). Some have been transformed to avoid confusion with others (e.g. "V") and, wherever possible, letters have been left unchanged but in small size ("C", "E", "K", "L", "M", "N", "O", "R", "S", "T", "U", "V", "W", "X", "Y" or "Z".

Still in this variant, the sign from the "shang" categories is ":" following the diacritical signs representing the RUCL, whereas an underlined diacritical signs representing the RUCL are used for the "xia" categories.

A completely alphabetical writing system for writing Mandarin, presented in the form of a "phonetic" bandwidth formed by using Pinyin transcription together with a "semantic" bandwidth in the form of diacritical signs added below Pinyin transcription. These signs are necessary and sufficient to identify to which specific character a given syllable corresponds. Adding the tone to the character's phonetic transcription is consequently possible but not essential for this identification. HanMuFa can therefore be an atonal alphabetic transcription of Mandarin or tones can be added if the user wishes it so.

HanMuFa can also become an alphabetic writing system for other languages initially transcribed into Chinese characters (Cantonese, Shanghainese or other Sinitic languages, Vietnamese, Korean, Japanese, etc.) with adaptation of the same principles.

Purposes of HanMuFa transliterating engine, which can be in a software format, comprise facilitating learning of Mandarin thanks to the use of HanMuFa.

HanMuFa transliterating engine can transliterate texts written in Chinese characters into HanMuFa or texts written in HanMuFa into Chinese characters.

HanMuFa transliterating engine's general operating principles are as follows:
 transliteration direction is chosen by the user;
 the user enters text in either Chinese characters or HanMuFa; and
 simultaneously, HanMuFa transliterating engine automatically tranliterates the entered text into the targeted writing system (HanMuFa or Chinese characters).

Numerous options make it possible to accelerate the understanding of the transliterating text.

Once started, HanMuFa transliterating engine displays the home screen illustrated in FIG. 6.
 part (1) of the screen displays the text written in Chinese characters;
 part (2) of the screen displays the text written in HanMuFa;
 part (3) of the screen is a text field used by the software to inform the user of technical events (especially relating to initialization issues), part (3) does not play any part during transliteration;
 menu (A) is used to select the direction and type of transliteration.

Types of transliteration can be either transliteration of HanMuFa to Chinese characters or of Chinese characters to HanMuFa or Pinyin transcription.

Figure 7:
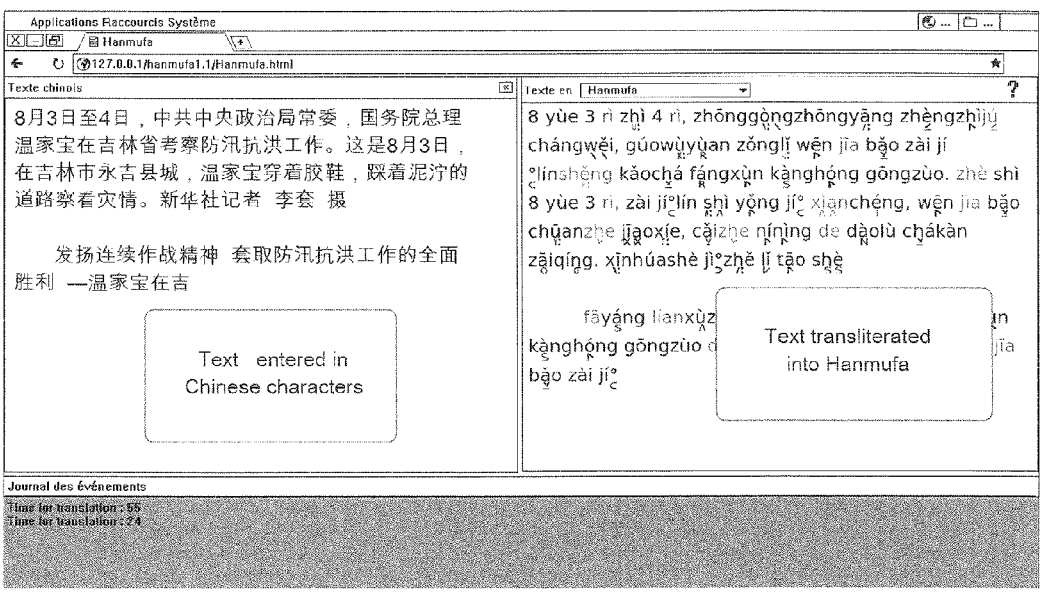
FIG. 7 is the screen shot of FIG. 6 with an example of a text in Chinese characters and in HanMuFa.

In this mode, a text written in Chinese character is transliterated into HanMuFa. The text can be entered using a virtual keyboard mechanism provided by the operating system (as is the case, for example, using the Sogou system or any other Input Method Editor or IME), or using copy/paste mechanisms from an existing document (see FIG. 7). Any other methods can also be used as long as they enable entering Chinese characters.

By default, the text is transliterated into HanMuFa. However, it is possible to transliterate the text into the following specific forms:
 Pinyin with tones: HanMuFa transliterating engine transliterates the characters into Pinyin graphemes while retaining tones;
 Pinyin without tones: HanMuFa transliterating engine transliterates the characters into Pinyin graphemes without the tones, for example in order to better show the role played by tones in an attempt, often unsuccessful, to distinguish between characters using Pinyin transcription;
 Pinyin with capital letters: HanMuFa transliterating engine transliterates the characters into Pinyin graphemes and, after every graphemes grouped into a syllable, HanMuFa transliterating engine adds the Radical Upper Case Letters assigned to the ideogram;
 Pinyin with radicals: HanMuFa transliterating engine transliterates the characters into Pinyin graphemes and, after every graphemes grouped into a syllable, HanMuFa transliterating engine adds the radicals assigned to the character, i.e. the conventional radicals and if there is a RUCL2, the diacritic associated to it in HanMuF;
 HanMuFa without tones: HanMuFa transliterating engine transliterates the characters into HanMuFa, thereby showing that the tones are not essential for distinguishing between the various characters that sound the same since HanMuFa diacritical signs are sufficient to handle this function.

The advantage of the different transliterating modes is that they enable the user to focus on the various successive phases of learning Mandarin, which grow in complexity:
 Pinyin with tones: learning pronunciation;
 Pinyin with radicals: learning radicals, a concept allowing an understanding of the meaning of the characters;
 Pinyin with upper case letters: learning upper case letters that is an alphabetical transliteration of the radicals; and
 HanMuFa: learning pronunciation and meaning of characters, as the HanMuFa graphemes comprise all information in the most possible concise form.

HanMuFa makes it possible to transliterate Chinese characters into letters. The various displays shown below highlight how this change can be gradually made.

During the transliteration, HanMuFa transliterating engine also performs segmenting. This is because in a classic Chinese text, characters are not separated with spaces. Therefore, segmenting comprises identifying words in the Chinese text and separating these words with spaces. Segmentation is a major step in making it easier to learn Chinese.

Figure 8:
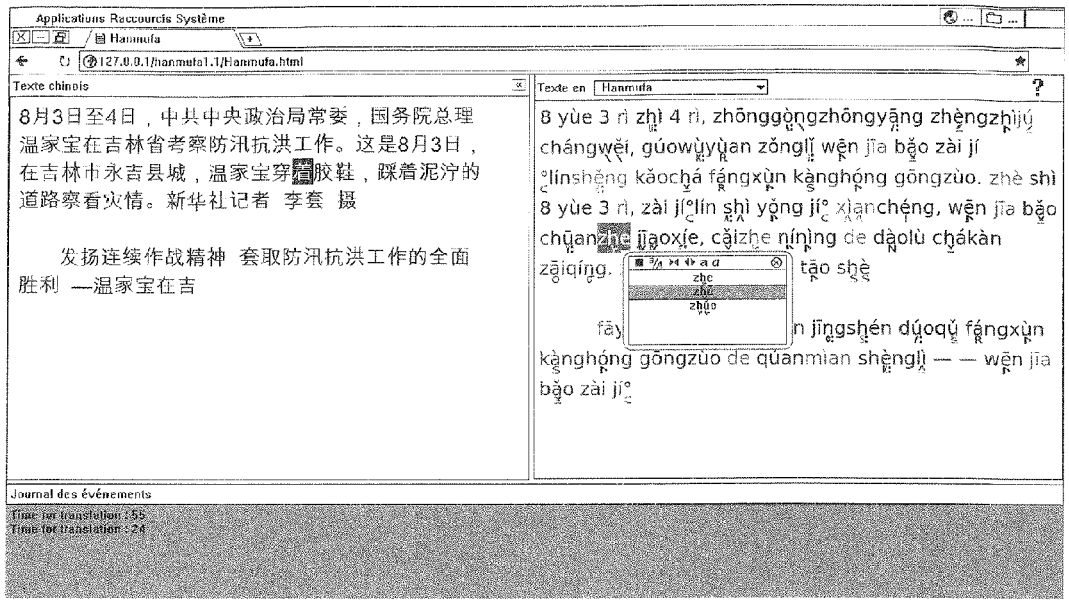
FIG. 8 shows an example of management of a Chinese character having more than one pronunciation.

One complexity of Chinese languages, e.g. Mandarin, comes from numerous ambiguities. This is due to the fact that some characters ("duoyin zi" which means characters with several pronunciations) may have more than one possible transliteration. During transliteration, HanMuFa transliterating engine detects these ambiguities and highlights the corresponding graphemes grouped in syllables in red. By default, HanMuFa transliterating engine chooses to display the most probable transliteration (with this probability defined in a database used by the software) (see FIG. 8).

If the user clicks on one of these ambiguous syllables, the syllable is highlighted (in reverse video mode for example). HanMuFa transliterating engine opens a window suggesting a list of all possible transliterations. The user may then choose the transliteration that best suits the context. Once the user has made his choice, HanMuFa graphemes grouped in a syllable are displayed in green to show that the ambiguity has been cleared up.

In this mode, the text in HanMuFa is entered in the right part of the screen. When text is entered, transliteration is automatically performed and the left part of the screen is automatically updated.

Figure 9:
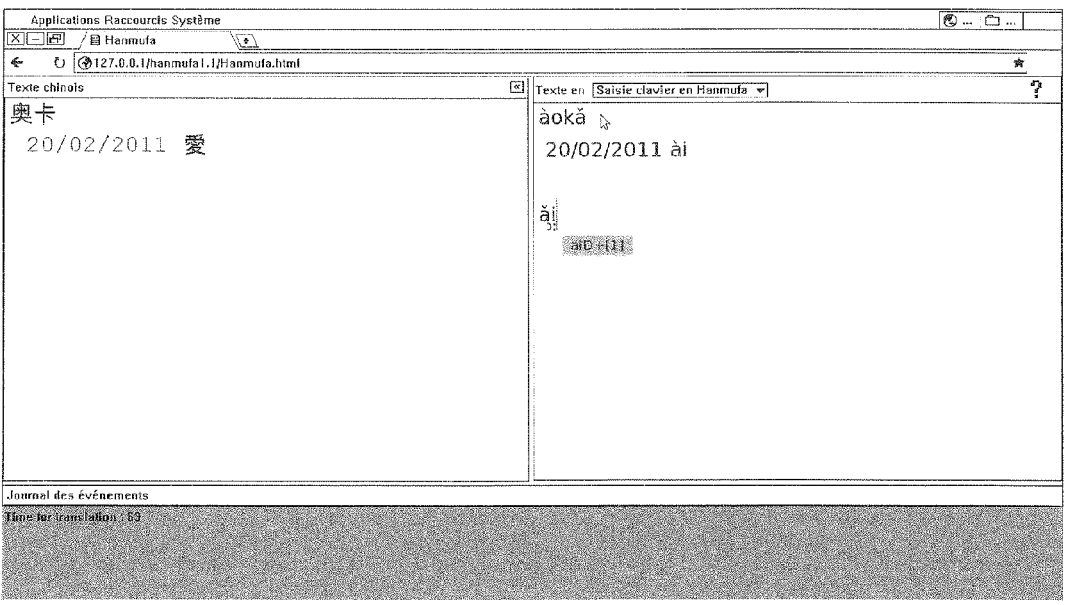
FIG. 9 shows an example of HanMuFa entering.

The data entry logic applied is as follows:
first the user enters the grapheme in "Pinyin without tone" form;
then the user enters the diacritical marks, using the Radical Upper Case Letters assigned to the syllable with the "+" and "−" keys when necessary; and
once the user feels that the data entry is finished, he presses the "Enter" key to validate the entries made (see FIG. 9).

When the user enters text, the text is displayed in two places.

The text is displayed in a small window that appears under the cursor. This window comprises the alphanumeric characters being typed in. This window may also take different colors, in line with the following criteria:
green: the text being entered exactly corresponds to a HanMuFa syllable;
orange: the text being entered does not exactly correspond to a syllable, however there are syllables that start with the text being entered;
red: the text being entered does not correspond to any of the HanMuFa syllables.

The text is also displayed in the right part of the screen, where the cursor is located. The text that is displayed here matches the text entered with the Radical Upper Case Letters transformed into diacritical signs.

Users may add text, as well as delete it. When one of the "Delete" keys are used, the software deletes all of the corresponding syllable. This makes it possible to guarantee that the text only contains legitimate HanMuFa syllables.

Furthermore, as the HanMuFa syllables are unambiguous by construction, no mechanism for resolving ambiguities is applied in this transliteration direction.

Another feature offered by HanMuFa transliterating engine is synchronization between the two parts of the screen. When a long text is transliterated, the entire text cannot be displayed in a single screen. In this case, HanMuFa transliterating engine uses scroll bars so that the user may move around within the text. The synchronization mechanism implemented by the software guarantees that the initial text and the transliterated text are always at the same level, visually.

Figure 10:
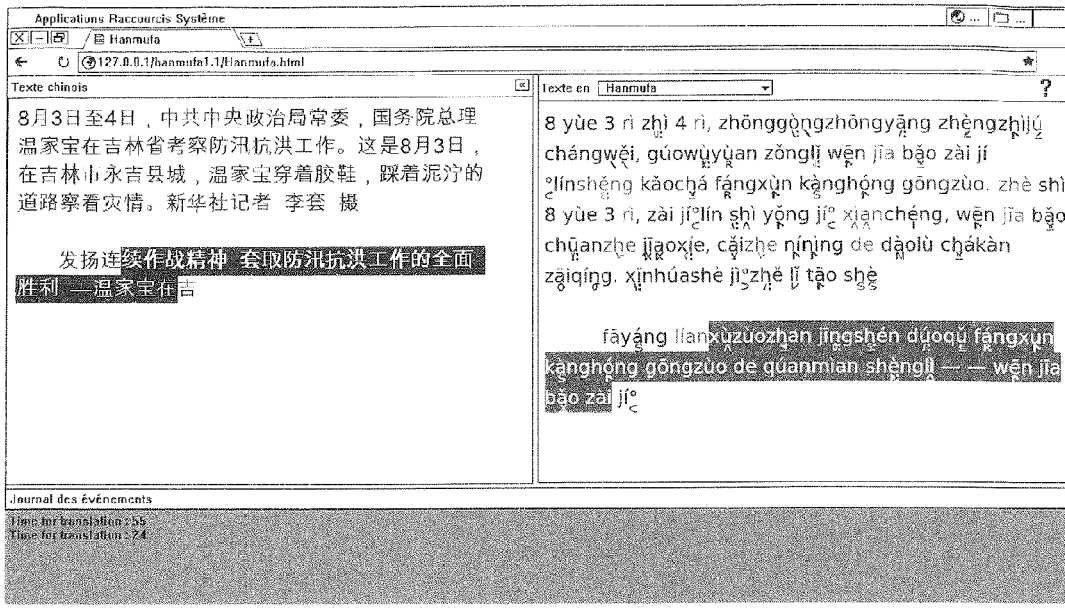
FIG. 10 illustrates synchronisation between the part of the screen showing Chinese characters and the other part of the screen showing HanMuFa.

In the same way, when the user selects a part of the text, HanMuFa transliterating engine highlights the corresponding text in the opposite part of the screen (see FIG. 10).

Synchronization is very important for it allows the user to easily establish the link between the entered text part and the corresponding transliterated text part. This feature therefore plays a significant role in facilitating learning.

The HanMuFa method is especially based on hierarchically arranging the Chinese characters. HanMuFa transliterating engine provides a mechanism for accessing data on PRC1, SPC, BDPC, CDPC, RUCL1 and RUCL2.

Figure 11:
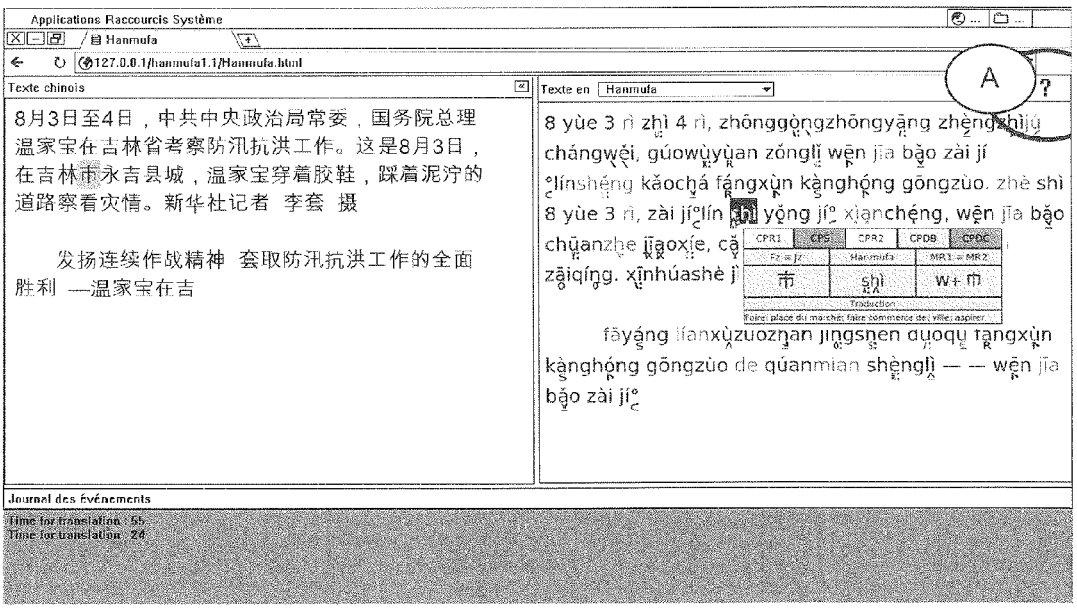
FIG. 11 shows a screen shot wherein a window given information on one HanMuFa syllable appears.
Figure 12:
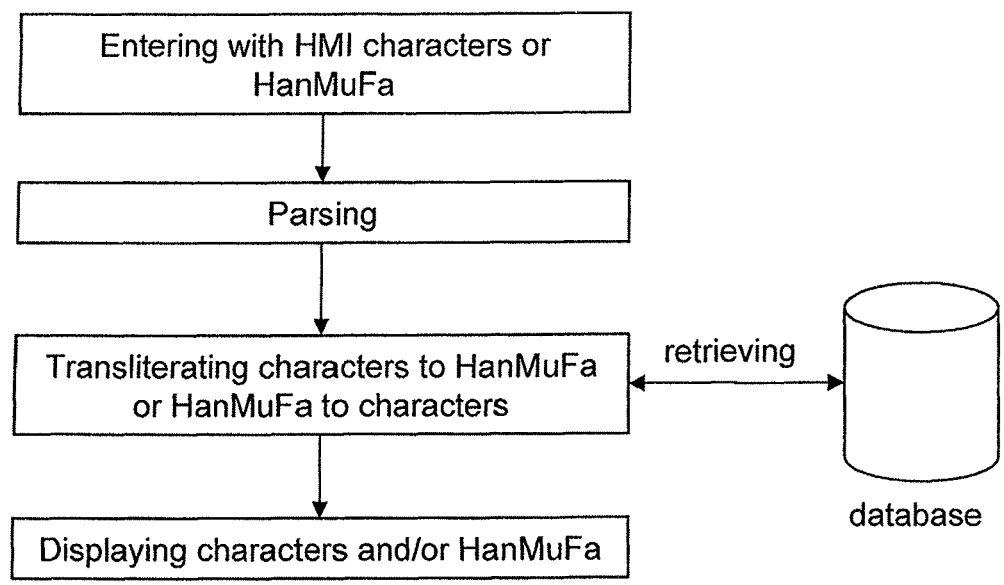
FIG. 12 is flow chart illustrating the method according to the invention.

This mechanism is implemented by activating an option (A) (see FIG. 11).

Once this option is activated, selecting HanMuFa graphemes grouped into a syllable from the right part of the screen displays a window comprising instructions on how to access the entire logic sequence, justifying the presence of all of the HanMuFa graphemes belonging to the corresponding character (namely 0 for PRC1; 1 for SPC and PRC2; and 2 for BDPC and CDPC) by displaying the characters corresponding to the different information (character itself, RUCL1 and RUCL2) and that are required for understanding it. Depending on the position of the syllable, in which the HanMuFa graphemes are grouped, in the hierarchy, only a subset of the information may be displayed:
if the Chinese character is a PRC1, then only HanMuFa grapheme data are accessible;
if the Chinese character is a SPC, HanMuFa grapheme data are accessible as well as the data on the assigned PRC1 character;
if the Chinese character is a PRC2, HanMuFa grapheme data are accessible as well as the data on the assigned PRC1 character;
if the Chinese character is a BDPC, HanMuFa grapheme data are accessible as well as the data on the assigned PRC1 and PRC2 characters;
if the Chinese character is a CDPC, HanMuFa grapheme data are accessible as well as the data on the assigned PRC1, PRC2 and BDPC characters.

The data available for a character comprises:
traditional and simplified form of the character;
any assigned Radical Upper Case Letters and assigned conventional radicals;
a translation into the user's language (for example French, English, etc.); and
HanMuFa graphemes.

Compared with other languages, Mandarin is a language that is hard to learn due to the additional complexity induced by the use of characters. The method based on HanMuFa graphemes makes it possible to add an intermediate stage when learning Mandarin, thereby making this learning process easier.

The interactivity provided by HanMuFa transliterating engine makes it possible to considerably facilitate learning stage of HanMuFa:
transliteration from one writing system to another is done in real time, as soon as a modification is made on one side, the result is immediately displayed on the other side, thus, largely facilitating character memorization;
a number of transliteration variants exist, allowing a progressive acquisition of the various notions of Mandarin;
HanMuFa transliterating engine enables the user to see a large amount of additional information on HanMuFa graphemes grouped in syllables, this therefore reduce the need for ancillary data;
segmentation and transliteration mechanism implemented in HanMuFa transliterating engine enables a user who knows HanMuFa to quickly access the content of a text written in Chinese characters.

HanMuFa transliterating engine is suitable for a wide variety of uses. It can be used by a new student for a step-by-step acquisition of various notions of Mandarin (tones and radicals). It can also be used by a more experienced student to study complex and voluminous Chinese texts.

The invention has been described with Mandarin written in Chinese characters and with Latin alphabet. However, HanMuFa can be adapted for another Sinitic language, such as Shanghainese or Cantonese, or another language like Korean, Japanese or (old) Vietnamese. Also transcription system of the targeted language used a basis for HanMuFa transliterating method can use Latin alphabet such as Hanyu Pinyin (simply called Pinyin), Wade-Giles Romanization, EFEO Romanization, Yale Romanization, Jyutping, Peh-oe-ji, Hepburn Romanization, Nihon-shiki, Kurei-shiki, McCune-Reischauer Romanization, Revised Romanization of Korean, quoc ngu. Transcription system of the targeted language used a basis for HanMuFa transliterating method can use another alphabet such as Cyrillic alphabet, Arabic alphabet, etc. Transcription system of the targeted language used a basis for HanMuFa transliterating method can use another phonetic writing system such as Japanese Kana (Katakana and/or Hiragana), Hangul (jamo), etc.

In the description "homophonous characters" means characters having the same pronunciation without taking tones into account, because the example of the HanMuFa method is described in a variant wherein tones are not used to sort Chinese characters. It is however possible to adapt HanMuFa method to take tones into consideration when sorting Chinese characters and eventually assigning RUCL1 and RUCL2. Thus, when this variant is foreseen, "homophonous characters" should be understood as characters having exactly the same pronunciation with tones taken into consideration.

The described method and all variants mentioned in the specification make part of the present invention.

Having thus described preferred embodiments of the invention, other variations and embodiments that do not depart from the spirit and scope of the invention will become readily apparent to those skilled in the art. The scope of the present invention is thus not limited to any one particular embodiment, but is instead set forth in the appended claims and the legal equivalent thereof.

The invention claimed is:

1. A method for transliterating an at least partially phonetic symbol-based writing system including symbols into a complex character-based writing system including characters, said method comprising:
    entering, with a human-to-machine interface, a string of symbols of said partially phonetic symbol-based writing system into a transliterating engine;
    parsing said string of symbols into a plurality of substrings, each substring forming an utterance unit corresponding to a character of said string of characters which corresponds to said string of symbols, and at least one substring of symbols including at least three symbols;
    transliterating said substrings into corresponding characters;
    displaying the corresponding characters;
    wherein said transliterating comprises matching, by database retrieval, each substring with one and only one character of the complex character-based writing system; and
    wherein, in said at least one substring of symbols including at least three symbols, which corresponds to one and only one character, at least one first symbol provides phonetic information, at least one second symbol provides information about a radical of said character and at least one third symbol provides information about the shape of the part of said character other than said radical.

2. The method of claim 1, further comprising displaying said string and said substrings of symbols.

3. The method of claim 1, further comprising performing, substantially synchronously with said entering of said string of symbols, said parsing, transliterating and displaying of said string of symbols.

4. The method of claim 1, wherein said at least partly phonetic symbol-based writing system is a partially alphabetic writing system.

5. The method of claim 4, wherein said partially alphabetic writing system comprises at least one phonetic substring of symbols comprising a substring of Latin letters.

6. A method according to claim 5, wherein the substring of Latin letters comprise diacritics.

7. The method of claim 1, wherein said character-based writing system is at least partly based on a Chinese character writing system comprising at least one of the following sets of characters: traditional hanzi, simplified hanzi, kanji, hanja, chu nho, and/or chu nôm.

8. The method of claim 1 wherein said symbol-based writing system comprises at least one phonetic substring of symbols, each phonetic substring of symbols comprising a series of at least one Latin letter, and, complies with one of the Romanization methods chosen among: Hanyu Pinyin, Wade-Giles Romanization, EFEO Romanization, Yale Romanization, Jyutping, Peh-oe-ji, Hepburn Romanization, Nihon-shiki, McCune-Reischauer Romanization, Revised Romanization of Korean, and/or quoc ngu.

9. The method of claim 1, further comprising segmenting said at least one string of characters to identify words and separating the identified words with spaces.

10. The method of claim 1, wherein said at least one second symbol, which provides information about a radical of said character, provides information about the shape or the meaning of said radical.

11. The method of claim 1, wherein said at least one second symbol, which provides information about a radical of said character, indicates a group of radicals.

12. The method of claim 11, wherein said group of radicals comprise sub-groups of radicals, each subgroup of radicals being indicated by an additional symbol in said substring or by the absence of an additional symbol in said substring.

13. The method of claim 12, wherein there a 26 groups of radicals and three sub-groups of radicals for each group of radicals.

14. The method of claim 1, wherein the absence of third symbol in a substring provides information about the character corresponding to said substring.

15. The method of claim 1, wherein the absence of second symbol and third symbol in a substring provides information about the character corresponding to said substring.

16. A method for transliterating a complex character-based writing system including characters into an at least partially phonetic symbol-based writing system including symbols, said method comprising:
    entering, with a human-to-machine interface, a string of characters of the complex character-based writing system into a transliterating engine;
    parsing said string of characters into individual characters, each character corresponding to one of a plurality of substrings of symbols;
    transliterating each of said characters into a corresponding substring of symbols;
    displaying said substring of symbols;
    wherein said transliterating comprises matching, by database retrieval, each substring series of symbols with one and only one characters;
    wherein at least one substring of symbols includes at least three symbols, which corresponds to one and only one character, at least one first symbol provides phonetic information, at least one second symbol provides information about a radical of said character and at least one third symbol provides information about the shape of the part of said character other than said radical.

17. The method of claim 16, further comprising displaying said string of characters.

18. The method of claim 16, further comprising matching, in database retrieval, a part of each of said characters individually with at least one substring of symbols, said at least one substring of symbols comprising only phonetic symbols, wherein at least one character is a most commonly used character corresponding to the phonetic substring of symbols.

19. A method according to claim 16, further comprising segmenting said at least one string of symbols to identify words and separating the identified words with spaces.

20. The method of claim 16, further comprising performing, substantially synchronously with said entering of said string of characters, said parsing, transliterating and displaying of said string of characters together with said string of symbols corresponding to said string of characters.

21. The method of claim 16, wherein said at least one second symbol, which provides information about a radical of said character, provides information about the shape or the meaning of said radical.

22. A computer-based system adapted to implement a method for transliterating an at least partially phonetic symbol-based writing system including symbols into a complex character-based writing system including characters, said method comprising:
    entering, with a human-to-machine interface, a string of symbols of said partially phonetic symbol-based writing system into a transliterating engine;
    parsing said string of symbols into a plurality of substrings, each substring forming an utterance unit corresponding to a character of said string of characters which corresponds to said string of symbols, and at least one substring of symbols including at least three symbols;
    transliterating said substrings into corresponding characters;
    displaying the corresponding characters;
    wherein said transliterating comprises matching, by database retrieval, each substring with one and only one character of the complex character-based writing system; and
    wherein, in said at least one substring of symbols including at least three symbols, which corresponds to one and only one character, at least one first symbol provides phonetic information, at least one second symbol provides information about a radical of said character and at least one third symbol provides information about the shape of the part of said character other than said radical.

23. A non-transitory computer program product, when executed in a computer-based system, to perform a method for transliterating an at least partially phonetic symbol-based writing system including symbols into a complex character-based writing system including characters, said method comprising:
    entering, with a human-to-machine interface, a string of symbols of said partially phonetic symbol-based writing system into a transliterating engine;
    parsing said string of symbols into a plurality of substrings, each substring forming an utterance unit corresponding to a character of said string of characters which corresponds to said string of symbols, and at least one substring of symbols including at least three symbols;
    transliterating said substrings into corresponding characters;
    displaying the corresponding characters;
    wherein said transliterating comprises matching, by database retrieval, each substring with one and only one character of the complex character-based writing system, and
    wherein, in said at least one substring of symbols including at least three symbols, which corresponds to one and only one character, at least one first symbol provides phonetic information, at least one second symbol provides information about a radical of said character and at least one third symbol provides information about the shape of the part of said character other than said radical.

24. A computer-based system adapted to implement a method for transliterating a complex character-based writing system including characters into an at least partially phonetic symbol-based writing system including symbols, said method comprising:
    entering, with a human-to-machine interface, a string of characters of the complex character-based writing system into a transliterating engine;
    parsing said string of characters into individual characters, each character corresponding to one of a plurality of substrings of symbols;
    transliterating each of said characters into a corresponding substring of symbols;
    displaying said substring of symbols;
    wherein said transliterating comprises matching, by database retrieval, each substring of symbols with one and only one character;
    wherein at least one substring of symbols includes at least three symbols, which corresponds to one and only one character, at least one first symbol provides phonetic information, at least one second symbol provides information about a radical of said character and at least one third symbol provides information about the shape of the part of said character other than said radical.

25. Non-transitory computer program product, when executed in a computer-based system, to perform a method for transliterating a complex character-based writing system including characters into an at least partially phonetic symbol-based writing system including symbols, said method comprising:
    entering, with a human-to-machine interface, a string of characters of the complex character-based writing system into a transliterating engine;
    parsing said string of characters into individual characters, each character corresponding to one of a plurality of substrings of symbols;
    transliterating each of said characters into a corresponding substring of symbols;
    displaying said substring of symbols;
    wherein said transliterating comprises matching, by database retrieval, each substring of symbols with one and only one character;
    wherein at least one substring of symbols includes at least three symbols, which corresponds to one and only one character, at least one first symbol provides phonetic information, at least one second symbol provides information about a radical of said character and at least one third symbol provides information about the shape of the part of said character other than said radical.

* * * * *